Nov. 16, 1937.  R. C. MILDNER  2,099,407
ELECTRIC CABLE
Filed Aug. 13, 1935  3 Sheets—Sheet 1
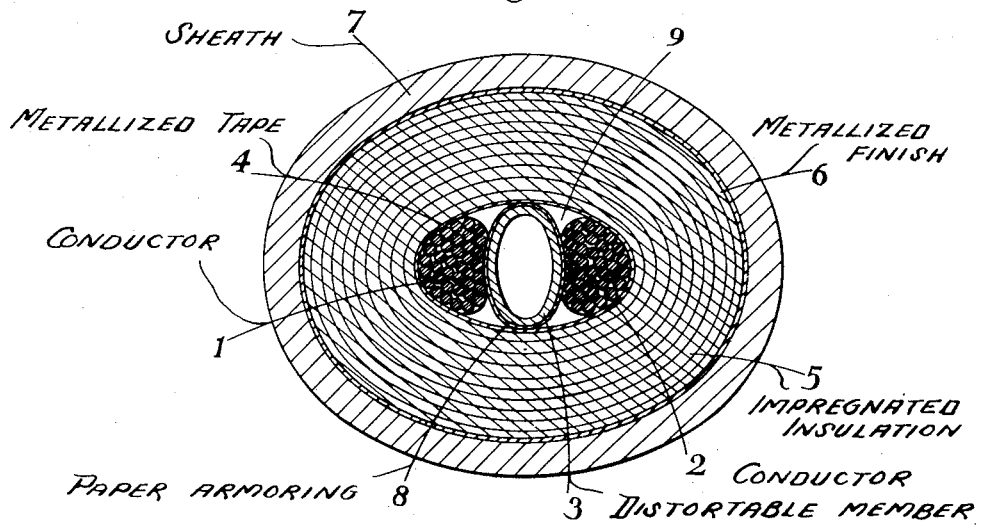
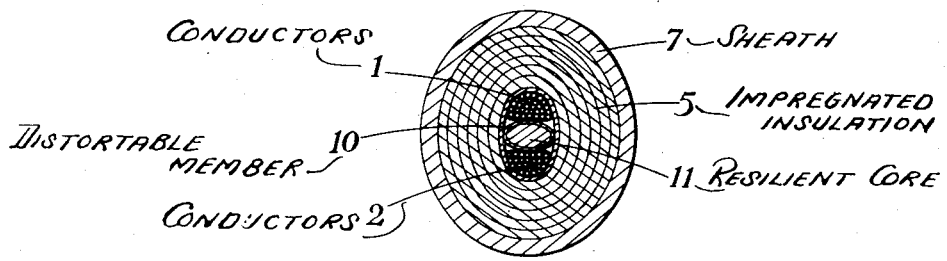
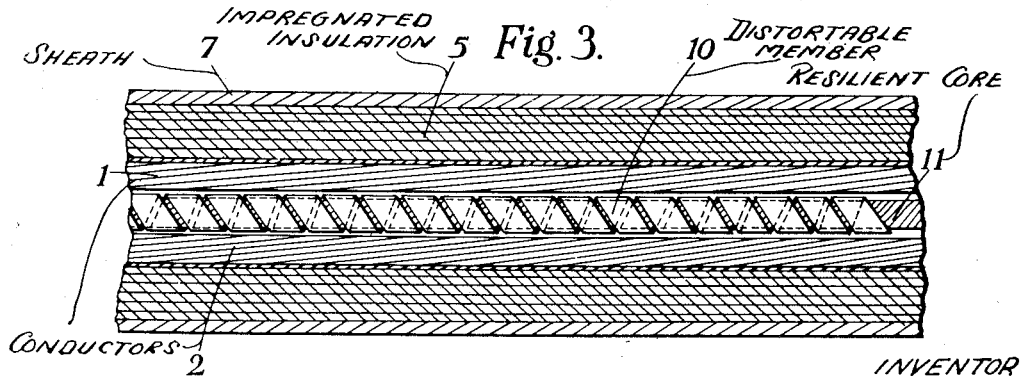
INVENTOR
R. C. MILDNER
BY R.C. Hopgood
ATTORNEY Patented Nov. 16, 1937

2,099,407

UNITED STATES PATENT OFFICE 2,099,407

ELECTRIC CABLE

Raymond Charles Mildner, London, England, assignor to International Standard Electric Corporation, New York, N. Y.

Application August 13, 1935, Serial No. 35,923
In Great Britain February 1, 1935

11 Claims. (Cl. 173—266)

This invention relates to electric cables of the type in which the insulation surrounding the core is impregnated with oil or compound.

Economic considerations require that high voltage cable be operated at elevated electrical stresses; it is a condition of successful operation under these conditions that physical pressure be maintained on the insulation so as to prohibit the formation of gaseous spaces in the working dielectric. This requirement is difficult to attain by reason of the large thermal expansion associated with the impregnating compound.

Various methods of maintaining this physical pressure have been tried out commercially but in each case the design has departed materially from the conception of the simple self-contained solid-core cable and involves a more expensive construction of cable and auxiliary apparatus with correspondingly high maintenance charges.

Attempts have been made to allow for the thermal expansion of the compound by providing a cable with a core of oval cross-section so that heating of the core distorts the cable towards the circular and insofar as this distortion is transmitted to the lead sheath, it will effect an increase in the volume enclosed by the sheath. But since there is no direct relation between the distortion of the core and the total expansion of the cable, the design can do little more than minimize the distensions of the sheath that would otherwise ensue.

The present invention provides an electric cable of non-circular cross section comprising impregnated insulation surrounding the core characterized by a resilient distortable compensating member within the cable arranged to resist deformation of the cable sheath to the circular form upon expansion of the impregnating medium and to assist in returning cable to its original shape on cooling.

Preferably the cable is of oval cross section and a resilient distortable member of oval cross section is associated with the core with its major axis at right angles to the major axis of the oval cable sheath.

The invention will be better understood by reference to the accompanying drawings, in which;

Fig. 1 is a cross section of a cable constructed according to the invention,

Fig. 2 is a cross section of a modified construction of cable according to the invention, Fig. 3 is a longitudinal section of the cable shown in Fig. 2.

Figure 4:
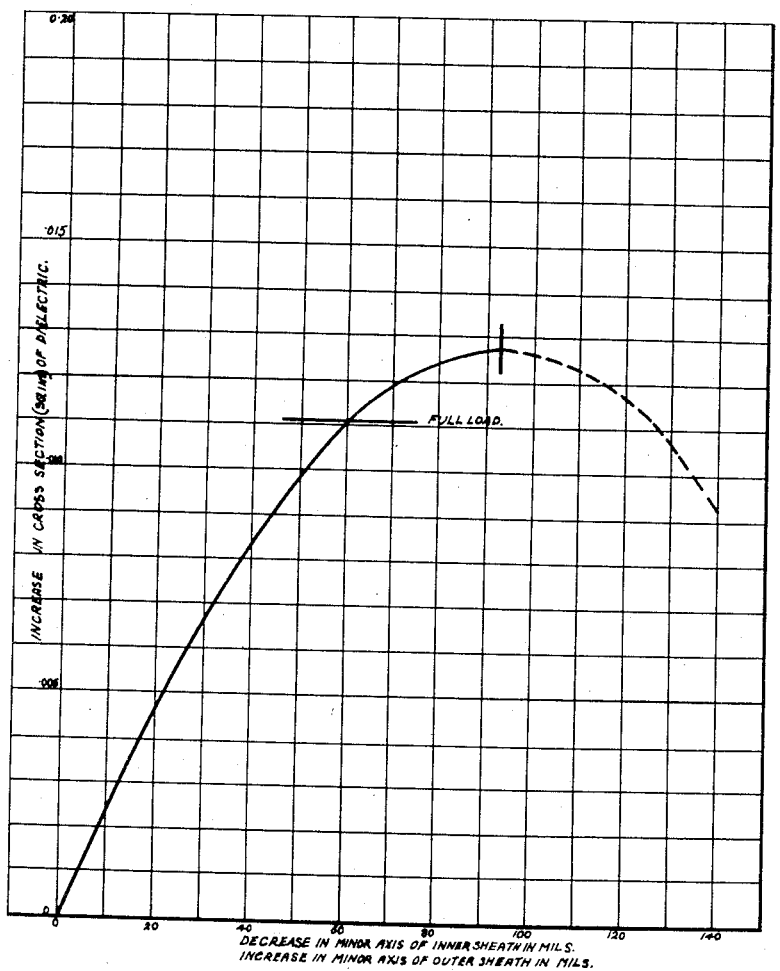
Figs. 4 and 5 are typical characteristic curves of the cables according to the invention.

The construction shown in Fig. 1 embodies a core comprising two stranded copper conductors 1, 2 disposed on either side of a central lead-tube 3 of elliptical cross-section and along its minor axis. The complete laid-up conductor is lapped over-all with metallized paper or metal tape 4 to give an elliptical cross-section with its major axis coincident with the minor axis of the central tube. The paper insulation 5 is lapped on in the usual way and provided with a metallized finish 6. Over-all a lead sheath 7 of oval shape conforming to the insulation is provided. Owing to the elimination of distension of the lead sheath in service, armouring may be applied around it with a minimum of elastic bedding. The lead tube 3 may be provided with paper armouring as shown at 8 and the spaces 9 between the tube and the conductors may be filled with paper wormings.

After installation in the ground and prior to jointing, the central lead tube 3 is filled with gas, preferably an inert gas such as nitrogen, at an elevated pressure, say 30 lb./in.$^2$ gauge, and sealed off. The conductor is then sweated up and the joint is completed in the normal way, taking care to ensure complete liquid filling of the joint, or complete pressure blockage as for example by the styrene joint.

The principle of operation is based on the fact that for a given periphery, the area enclosed by the circular form is a maximum: the expansion of the compound is therefore accommodated by a distortion of the cross-section rather than by the distension of the lead sheath. By disposing the two sheaths capable of distortion so that their major axes are at right angles to one another, an equilibrium position is readily obtained in which the insulation assumes a liquid pressure equal to the gas pressure within the central tube and will only deviate slightly from it under transient conditions of loading. The inner tube then has only to withstand the pressure-difference capable of effecting the necessary distortion, which is resisted only by the two lead sheaths and the paper insulation. The inner sheath may therefore be relatively thin, which is advantageous since it leaves it flexible in spite of its small diameter and permits it to contribute an appreciable proportion of the total volumetric distortion required. The remainder of this distortion is supplied by the outer sheath.

It is essential to the purpose of the invention that the axes of the ellipses should be mutually perpendicular, for otherwise the internal gas pressure would cause the cable to assume gradually a circular shape so that the beneficial effects of avoidance of inelastic distension of the sheath would no longer be forthcoming. A compressive stress is set up across the dielectric along the major axis of the outer sheath and a differential action occurs until equilibrium is set up, internal and external to the inner sheath.

Referring now to the modified construction shown in Figs. 2 and 3 it will be seen that the resilient distortable member takes the form of a helical spring 10 which is wound in the shape of an oval and the space inside it may be filled with a paper or like resilient core 11 or even a conductor providing sufficient space is allowed for inward deformation of the spring. The remainder of the cable construction may be as described with reference to Fig. 1.

It will be understood that the essential feature of the invention is some sort of spring device separating the two sections of the core strand, this spring device being put under compression when the cable heats up so that the oval sheath surrounding the insulation is distorted towards a circle. On the cooling of the cable the spring device expands and helps to restore the lead sheath to its original oval shape.

Figure 5:
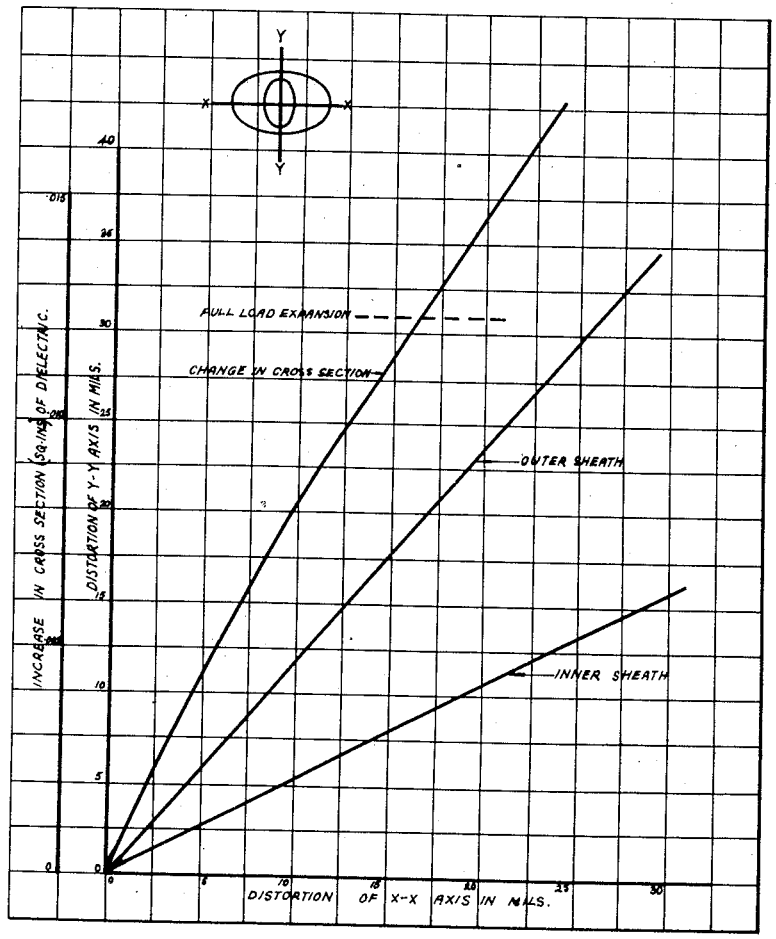

Two typical designs have been worked out and the characteristics are illustrated in the accompanying Figures 4 and 5 respectively.

Fig. 4, a .09 sq. in. copper core is used in connection with a lead tube of elliptical cross-section, 0.46" x 0.26". Assuming a dielectric thickness of 350 mils, the internal dimensions of the sheath are 1.17" x 1.35". It will be seen that the maximum distortion possible, which occurs when the outer sheath is circular, provides but a small margin over the requirements corresponding to full load.

Fig. 5 is based on a 0.25 sq. in. copper section with similar dielectric thicknesses, and a wider range of expansion is obtained by employing cross-sections deviating further from the circular. The external dimensions of the inner sheath are 0.46" x 0.26" whilst the outer lead sheath is 1.62" x 1.34" internal.

A wide margin of possible expansion is achieved in this design over the full load expansion.

A number of modifications are possible without departing from the scope of the invention; thus the two copper strands may be separately lead-sheathed and provided with expansion-joints to overcome differential-expansion problems. Again part of the copper section may be accommodated within the central elliptical tube or alternatively disposed around the formed elliptical core as a helical layer.

What is claimed is:

1. An electric cable comprising a core of oval cross-section, impregnated insulating material surrounding said core, and a metal sheath surrounding said insulating material; said core including a conductor, and a compensating member of oval cross section which is arranged with its major axis at right angles to the major axis of the oval core.

2. An electric cable comprising a metal sheath of oval cross section, a conductor with surrounding impregnated insulation within said sheath and a compensating member of oval cross section centrally disposed within the cable and with its major axis at right angles to the major axis of the sheath.

3. An electric cable according to claim 2, wherein the compensating member takes the form of a sealed tube adapted to be filled with fluid under pressure.

4. An electric cable according to claim 2, wherein the compensating member takes the form of a helical spring of oval cross-section.

5. An electric cable according to claim 2, wherein the compensating member is arranged in the centre of the conductor.

6. An oval electric cable comprising a compensating member of oval cross-section, conducting strands arranged along the sides of said compensating member in line with the minor axis thereof to form a composite core of oval cross-section the minor axis of which is coincident with the major axis of the compensating member, said conducting strands and compensating member being secured together to form said composite core of oval cross-section, porous insulation surrounding said composite core and a metal sheath of oval cross-section surrounding said insulation with its major axis at right angles to the major axis of said compensating member.

7. An electric cable according to claim 6, wherein the compensating member and conducting strands are surrounded by electrically conducting tape.

8. An electric cable according to claim 6, wherein the porous insulation is provided with an electrically conducting outer layer underneath the metal sheath.

9. An electric cable comprising a metal sheath of oval cross-section having a conductor with impregnated paper insulation, and means within the cable for returning said sheath to normal shape after distortion thereof caused by temperature changes during operation of the cable.

10. An electric cable comprising a metal sheath of oval cross-section, a conductor, impregnated insulation surrounding said conductor and a resilient distortable compensating member positioned in said insulation with its major axis at right angles to the major axis of the oval sheath so that it assists in returning the cable to its original shape on cooling after deformation of the cable sheath to the circular form upon expansion of the impregnating medium.

11. An electric cable comprising a conductor, impregnated insulation surrounding said conductor, a metal sheath of oval cross-section surrounding the insulation adapted to be distorted towards circular shape with expansion of the impregnating medium upon heating of the cable, and a pressure sensitive compensating device within the cable arranged to exert a pressure mainly along the major axis of said metal sheath so as to restore the metal sheath to oval shape upon cooling.

RAYMOND CHARLES MILDNER.